United States Patent [19]

Beckmann

[11] 4,053,894
[45] Oct. 11, 1977

[54] RADIO SIGNAL SWITCHING SYSTEM EMPLOYING DIELECTRIC ROD ANTENNAS

[75] Inventor: Oskar Beckmann, St. Polten, Austria

[73] Assignee: Siemens Aktiengesellschaft, Berlin and Munich, Germany

[21] Appl. No.: 560,404

[22] Filed: Mar. 20, 1975

[30] Foreign Application Priority Data

Mar. 21, 1974   Germany .......................... 2413744

[51] Int. Cl.² .......................................... H01Q 13/20
[52] U.S. Cl. .................................... 343/225; 343/785
[58] Field of Search ............... 343/785, 786, 783, 789, 343/817, 767, 769, 770, 776, 771, 775, 225, 226, 227, 228; 340/171 A

[56] References Cited

U.S. PATENT DOCUMENTS

| 2,206,683 | 7/1940 | Wolff | 343/786 |
|---|---|---|---|
| 2,316,151 | 4/1943 | Barrow | 343/786 |
| 2,419,205 | 4/1947 | Feldman | 343/785 |
| 2,425,336 | 8/1947 | Mueller | 343/785 |
| 2,460,401 | 2/1949 | Southworth | 343/785 |
| 2,542,980 | 2/1951 | Barrow | 343/785 |
| 2,624,002 | 12/1952 | Bouix | 343/785 |
| 3,111,672 | 11/1963 | Carr | 343/785 |
| 3,216,018 | 10/1965 | Kay | 343/786 |
| 3,331,073 | 7/1967 | Horst | 343/911 R |
| 3,483,564 | 12/1969 | Glynn | 343/771 |
| 3,665,475 | 5/1972 | Gram | 325/37 |
| 3,765,021 | 10/1973 | Chiron et al. | 343/785 |

FOREIGN PATENT DOCUMENTS

1,252,216   12/1960   France .................................. 343/785

Primary Examiner—Eli Lieberman
Attorney, Agent, or Firm—Kenyon & Kenyon, Reilly, Carr & Chapin

[57] ABSTRACT

A circuit arrangement for the wireless transmission of a control signal to the control path of a controllable semiconductor valve is disclosed. More particularly, in order to avoid corona discharges at the receiving antenna of the circuit, the latter antenna is constructed in the form of a high-frequency radiator which is comprised of at least partially electrically nonconductive material.

8 Claims, 5 Drawing Figures

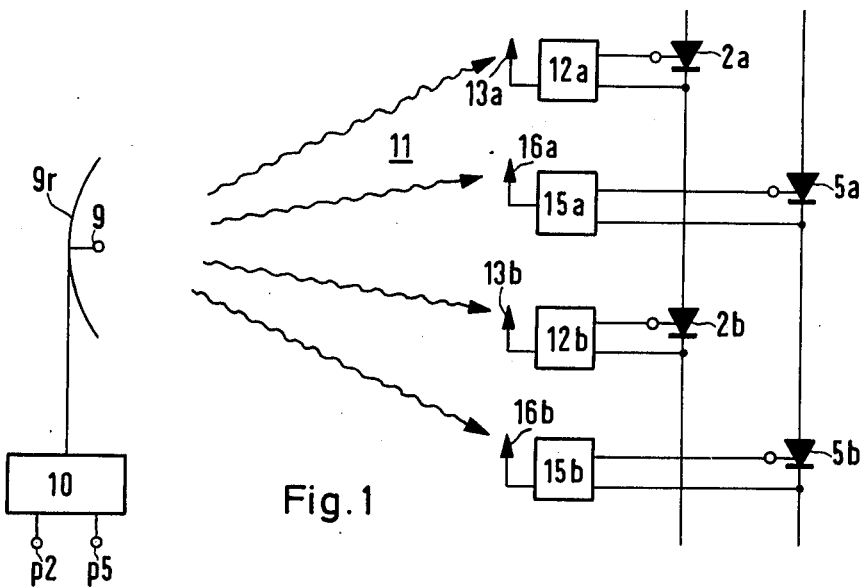
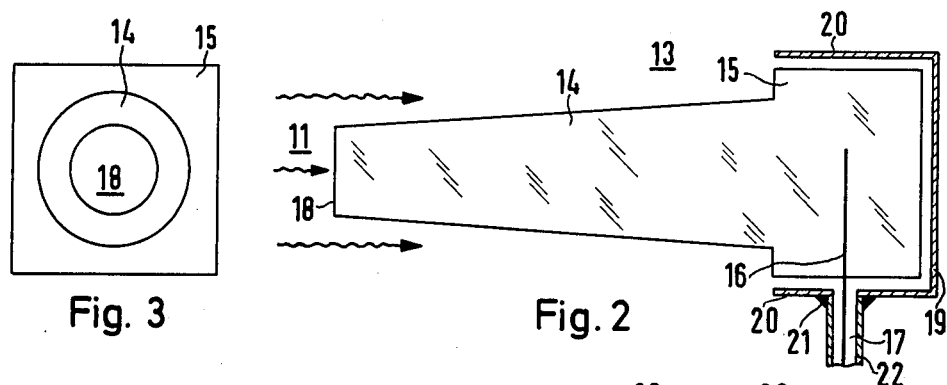
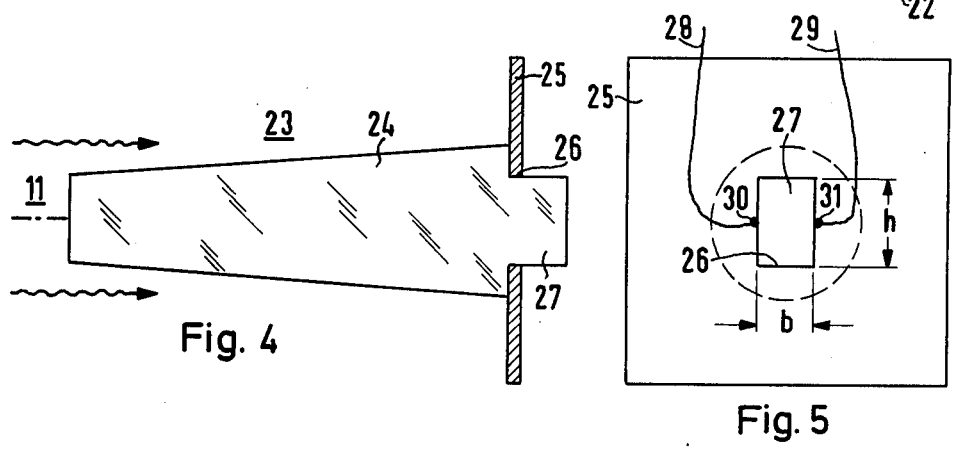

RADIO SIGNAL SWITCHING SYSTEM EMPLOYING DIELECTRIC ROD ANTENNAS

BACKGROUND OF THE INVENTION

1. Field of the Invention

The invention concerns a circuit arrangement for the wireless transmission of a control signal to the control path of a controllable semiconductor valve, particularly a thyristor, which can, preferably, be used in a static converter which converts high voltages. More particularly, the invention relates to a circuit arrangement wherein the aforesaid control signal is employed for the modulation of a high-frequency transmitter, the latter transmitter being arranged at some distance from a high-frequency receiver which comprises a demodulator whose output signal is fed to the control path of the semiconductor valve.

2. Description of the Prior Art

In the above-mentioned type of circuit arrangement, due to the large potential differences between the individual semiconductor valves or between a semiconductor valve and chassis or ground, discharges are apt to occur on the receiving side. These discharges are promoted by metallic parts with points and sharp edges and, in particular, by the receiving antenna of the high-frequency receiver.

It is therefore an object of the present invention to provide a receiving antenna which does not promote electrical discharges.

SUMMARY OF THE INVENTION

According to the present invention the above and other objectives are accomplished in the above-described type of circuit arrangement by providing that the receiving antenna of the high-frequency receiver be in the form of a high-frequency radiator which is comprised of at least partially electrically nonconductive material. Advantageously, such an antenna is found to couple a large part of the signal radiated by the high-frequency transmitter to the high-frequency receiver.

According to another aspect of the invention, a still larger amount of radiated energy can be coupled to the receiver by providing that the aforesaid receiving antenna have an elongated shape and a length, as measured in the direction of radiation of the high-frequency transmitter, which causes the incident high-frequency wave energy to suffer a phase shift of at least 180°.

In one particular embodiment, the receiving antenna is designed as a cylindrical rod. In this embodiment improved directional properties of the antenna are, advantageously, realized by forming the rod with a taper from its front to rear, i.e., along its longitudinal direction and against the direction of radiation of the high-frequency transmitter.

Additionally, the high-frequency energy entering the rod can be utilized to the fullest extend by providing a metallic reflector at the end of the rod. Advantageously, this metallic reflector can be furter developed into a metallic shield which is arranged at the end of the rod and surrounds such end. Such a shield serves to shield against interfering radiation and to ensure good mechanical protection against damage. Finally, it also acts as a cavity resonator, thereby ensuring good coupling of the rod to its associated connecting cable. In this embodiment, the aforesaid connecting cable, which leads from the receiving antenna to the high-frequency receiver of the circuit arrangement, can be connected in an electrically conducting manner with the reflector or the shield. A separate connecting lead to the chassis or ground potential or to another reference potential thereby becomes unnecessary.

A coaxial cable is preferably used as the connecting cable. To obtain a good polarization effect, the connecting cable should preferably be connected in the vicinity of the end of the rod perpendicularly to the longitudinal direction of the rod.

The aforementioned reflector arranged at the end of the rod can also be further developed so as to form with the rod a slot antenna. In such case, the rear end of the rod is provided with a metal plate, the normal of which is aligned in the direction of the radiation of the high-frequency transmitter. Additionally, the metal plate is provided with a slot whose height is equal to a half wavelength of the energy in the rod and whose width is substantially smaller than the half wavelength of such energy. Moreover, with this structure the rod can be readily fastened by bringing the rod partially through the slot via a reduced cross section at its rear.

Advantageously, the receiving antenna of the present invention can be comprised of a plastic material, e.g., polyfluoroethylene which is known under the trademark "Teflon." However, in order to greatly increase the dielectric constant of such plastic material, metal particles, e.g., gold and/or silver dust, can be admixed to the material by finely distributing such particles therethrough.

BRIEF DESCRIPTION OF THE DRAWING

The aforementioned aspects and features of the present invention will become more apparent upon reading the following detailed description in conjunction with the accompanying drawing, in which:

FIG. 1 shows a circuit arrangement for the wireless transmission of control signals to the control paths of several semiconductor valves of a static converter;

FIG. 2 illustrates, in cross section, a receiving antenna in accord with the invention which is in the form of a rod and which is suitable for use in the arrangement of FIG. 1;

FIG. 3 illustrates the antenna of FIG. 2 viewed in the direction of the radiation being received thereby;

FIG. 4 shows, also in cross section, a second receiving antenna in accord with the invention which is in the form of a slot antenna; and FIG. 5 shows the antenna of FIG. 4 viewed from its rear side.

DETAILED DESCRIPTION

FIG. 1 shows two series-connected controllable semiconductor valves 2a and 2b as well as two further series-connected controllable semiconductor valves 5a and 5b. These valves represent components of a static converter having semiconductor valves, particularly thyristors, arranged in a three-phase bridge circuit. The two pairs of respective semiconductor valves 2a, 2b and 5a, 5b belong to different branches of the converter. It should be noted that, in actual practice, each of these branches will have many more than the illustrated number of semiconductor valves, as the converter is of a type which is to be used for converting high voltages. In particular, the converter may be of a type used in a high-voltage d-c transmission system.

A control signal transmitter (not shown here) supplies control signals in a predetermined sequence and of a predetermined frequency for activating all branches of the converter. Of these control signals, only the control signals $p2$ and $p5$ are specifically illustrated in FIG. 1. The signals $p2$ and $p5$ are used for the wireless firing of the semiconductor valves $2a$, $2b$ and $5a$, $5b$, respectively. In particular, such signals are transmitted to the control paths of the semiconductor valves $2a$, $2b$ and $5a$, $5b$ sequentially by means of a high-frequency transmission path. The common firing of the semiconductor valves $2a$ and $2b$, which belong to the same branch in the converter, will be discussed first.

More specifically, as shown in FIG. 1, the control signal $p2$ for the semiconductor valves $2a$, $2b$ is fed to a high-frequency transmitter 10 which is equipped with a transmitting antenna 9 and a reflector $9r$. The high-frequency transmitter 10 emits an output signal having a carrier frequency $f0$ which may, for example, be 2.45 GHz and an amplitude modulation which is controlled by the control signal $p2$ being applied to the modulation input of the transmitter. Specifically, when the control signal $p2$ is different from zero, the carrier frequency $f0$ is amplitude-modulated with a modulation frequency $f2$ of, for example, 10 MHz. The transmitting antenna 9 then radiates a transmitted signal 11 which comprises, in addition to the carrier frequency $f0$, the frequencies ($f0 \pm f2$). The latter signal is radiated by the transmitting antenna 9 as a parallel beam or, as shown, radially in a direction toward the location of the semiconductor valves $2a$, $2b$.

At some distance from the transmitting antenna 9 are high-frequency receivers $12a$, $12b$, each of which is associated with one of the semiconductor valves $2a$, $2b$. Associated with the receiver $12a$ and $12b$ are receiving antennas $13a$ and $13b$, respectively. The antenna $13a$ and $13b$ are arranged to face the transmitting antenna 9 so that the transmitted signal 11 can be received at maximum strength.

The high-frequency receivers $12a$, $12b$ are each of a similar design. In particular, each comprises a demodulator whose output signal is fed to the control path of the associated semiconductor valve $2a$ and $2b$ via, for example, a multivibrator circuit and/or a firing circuit as is taught in the German Pat. No. 1,538,099. The demodulator, which typically might comprise a rectifier with a filter tuned to the modulation frequency $f2$, serves to selectively filter the frequency $f2$ from the received signal so that only the latter frequency can exert an influence on the valves $2a$ and $2b$. Thus, as soon as the control signal $p2$ is present at the modulation input of the high-frequency transmitter 10, the two semiconductor valves $2a$, $2b$ are fired.

It should be noted that the firing information is transmitted by the high-frequency transmission signal 11 independently of the potential level of the signal. As a result, large potential differences between the high-frequency transmitter 10 and the semiconductor valves $2a$, $2b$ have no adverse effect on operation.

As above indicated, the transmitter 10 also transmits the further control signal $p5$ for the purpose of controlling the firing of the further semiconductor valves $5a$, $5b$. The control signal $p5$ is different from zero at times which are different from those at which the control signal $p2$ is different from zero. As a result, the semiconductor valves $5a$, $5b$ fire at times which differ from those at which the semiconductor valves $2a$, $2b$ fire. Additionally, when the control signal $p5$ is different from zero, the carrier frequency $f0$ of the high-frequency transmitter 10 is modulated with a further modulation frequency $f5$, which may, for example, be 20 MHz. Thus, when the signal $p5$ is different from zero the transmitted signal takes on the additional frequencies ($f0 \pm f5$).

The semiconductor valves $5a$, $5b$ are, likewise, associated with high-frequency receivers $15a$, $15b$, respectively which include receiving antennas $16a$, $16b$ respectively. The receivers $15a$ and $15b$ are of a similar design to the receivers $12a$ and $12b$ except that their demodulators are tuned, not to the modulation frequency $f2$, but rather to the modulation frequency $f5$. The receivers $15a$ and $15b$, therefore, pass a firing signal to the semiconductor valves $5a$, $5b$ only if the transmitted signal has a component with the modulation frequency $f5$. The passage of other frequencies through these receivers is thus largely blocked, so that unintended firing is practically impossible.

As was alreadly mentioned, the semiconductor valves $2a$, $2b$ and $5a$, $5b$ are components of a static converter which converts high voltages as, e.g., voltages of 1 MV. In such a converter there is a danger that discharges are apt to occur because of the large potential differences between the individual semiconductor valves or between a semiconductor valve on the one hand and the chassis or ground, on the other hand. In particular, in prior structures such discharges have often been promoted by the receiving antennas $12a$, $12b$ and $15a$, $15b$ which have, typically, been formed as dipole antennas comprising purely metallic materials. In accordance with the principles of the present invention, antennas are provided for use as antennas $12a$, $12b$ and $15a$, $15b$ which are formed so as to inhibit the occurrence of the afore-mentioned discharges.

More specifically, FIGS. 2 and 3 show cross section and top views, respectively, of a first embodiment of a receiving antenna 13 in accordance with the principles of the present invention. Particularly, in accord with the invention, the receiving antenna 13 is in the form of a high-frequency radiator which is comprised of at least partially electrically nonconductive material.

As shown, the receiving antenna 13 comprises an elongated structure of dielectric material, having a length dimension which is considerably greater than its diameter dimension. Because of its good machinability, a plastic material such as polyfluoroethylene, which is known under the trademark "Teflon," can preferably be used as the dielectric material comprising antenna 13. Moreover, in order to obtain a material with a higher dielectric constant, finely distributed metal particles such as, for example, gold or silver dust can be admixed with the dielectric material.

As can be seen, the receiving antenna 13 is aligned with its longitudinal axis facing toward the transmitting antenna 9. Moreover, as shown, the antenna comprises a rod-shaped front part 14 which is circular in cross section and which is tapered from its rear to front end, i.e., as seen in the direction toward the transmitting antenna and against or opposite the direction of the incoming radiation. By so tapering the front part 14, a good directional characteristic for the antenna is achieved. The front part 14 sits on or is supported by a rear part 15 which, as shown, has the form of a cubic step. In principle, rear part 15 may be of any other conventional configuration as, for example, a cylindrical configuration. Disposed within the rear part 15 is the end section of the inner conductor 16 of a connecting cable 17, which typically might be a coaxial cable. The connecting cable 17 serves to connect the receiving antenna 13 to its associated high-frequency receiver.

The end section of the inner conductor 16 is inserted into the part 15 perpendicularly to the longitudinal axis of the part 14, so that a good polarization effect is obtained. The inner conductor 16 thus acts as a short dipole antenna which is surrounded by dielectric material.

The length of the receiving antenna 13 is selected so that, when measured in the direction of radiation of the transmitted signal 11 and between the front surface 18 of the part 14 and the end section of the inner conductor 16, the incident high-frequency wave 11 suffers, along the path described, a phase shift of at least 180°, i.e., a phase displacement of at least half a wavelength. The length of the receiving antenna 13 is, therefore, dependent on the dielectric material used.

The rear end of the part 15 is provided at a distance from the rear end surface thereof with a metallic reflector 19 which acts to promote substantial utilization of the high-frequency energy entering the antenna. Additionally, as shown, the metallic reflector 19 is also supplemented by metallic side walls 20 which together therewith form a shield 19, 20. This shield is connected at a joint 21 with the outer conductor 22 of the feed cable 17 in an electrically conducting manner. The shield 19, 20 serves to shield against electromagnetic interference radiation and, furthermore, it afords mechanical protection to the receiving antenna 13. Moreover it also acts as a cavity resonator, whereby good coupling of the receiving antenna 13 to the feed cable 17 is assured.

FIGS. 4 and 5 show cross section and rear elevation views, respectively, of another embodiment of a receiving antenna 23 in accord with the present invention. The antenna 23 also is in the form of a high-frequency radiator comprised of at least partially electrically non-conductive material. More particularly, in this embodiment the receiving antenna 23 is designed as a slot antenna. As shown, antenna 23 comprises an elongated part 24 having a circular cross section and formed from a dielectric material. The part 24 is tapered in the direction facing toward the transmitting antenna and is terminated with a metal plate 25 which is made, for example, of copper. The metal plate 25 is aligned so that its normal is in the direction facing toward the transmitting antenna. Additionally, the outside dimensions of the plate are somewhat larger than the diameter of the part 24 at its end. The distance between the front surface of the part 24 and the rear surface at the metal plate 25 is made so that incident wave energy propagating therebetween undergoes a phase shift of at least 180°.

As shown more clearly in FIG. 5, a slot 26 is provided at the center of the metal plate 25. The dimensions of the slot 26 depend upon the wavelength of the incident energy 11 when propagating within part 24 and, thus, upon the dielectric material comprising the latter. More specifically, the slot has a height which is equal half a wavelength of such energy when in the part 24, and a width b which is substantially smaller than such half wavelength. The width b may, for instance, be one-tenth of the wavelength.

The end portion 27 of the part 24 is brought through the slot 26 with a reduced cross section which fits the slot 26. In this manner, the part 24 is fastened to the metal plate 25. The metal plate 25 thus serves as both a support plate and a metallic reflector.

As seen from FIG. 5, two feed lines 28, 29 are symmetrically arranged at the points 30 and 31, the latter points being located at half the height of the slot. These feed lines serve as a means for connecting the antenna 23 to its associated high-frequency receiver.

What is claimed is:

1. A transmission arrangement for the transmission of a control signal to each control path of a number of controllable semiconductor valves in a static high-voltage converter and for firing said valves, comprising:
   a. a high-frequency transmitter for emitting high-frequency electromagnetic radiation which is modulated in dependence upon said control signal;
   b. a plurality of high-frequency receivers located at some distance from said transmitter, each of said receivers being associated with one of said valves and each including a demodulator whose output is fed as a firing signal to the control path of the associated valve; and
   c. a number of receiving antennas for receiving said high-frequency electromagnetic radiation, each receiving antenna being associated with one of said plurality of high-frequency receivers, each receiving antenna having a front part in the form of a cylindrical rod tapered along its longitudinal axis, said cylindrical rod having its smaller end pointed in the direction of the transmitted high-frequency electromagnetic radiation which it is to receive and said cylindrical rod consisting of material which is electrically non-conductive, and each receiving antenna having a rear part including coupling means for coupling the high-frequency electromagnetic radiation traveling along said cylindrical rod to the associated high-frequency receiver, a metal plate being disposed at the larger end of said rod, such that the normal to said plate is aligned with the radiation direction of said transmitter, said plate having a slot whose height is equal to half a wavelength of said radiation when said radiation is in said rod and whose width is substantially smaller than said half a wavelength, whereby the receiving antenna will not promote electrical discharges which would otherwise result because of the large potential difference between individual semiconductor valves and between a semiconductor valve and ground.

2. An arrangement in accordance with claim 1 in which each of said antennas has a length, as measured in the direction of radiation of said transmitter, which is such that said radiation upon traveling along the cylindrical rod to said coupling means experiences a phase shift of at least 180°.

3. An arrangement in accordance with claim 1 in which said larger end is partially brought through said slot.

4. An arrangement in accordance with claim 1 in which said rod comprises a plastic material.

5. An arrangement in accordance with claim 4 in which said plastic material is polyfluoroethylene.

6. An arrangement in accordance with claim 4 in which said rod further includes metal particles, said particles being admixed with and finely distributed through said plastic material.

7. An arrangement in accordance with claim 6 in which said metal particles comprise gold dust.

8. An arrangement in accordance with claim 6 in which said metal particles comprise silver dust.

* * * * *